United States Patent [19]

Rowland

[11] Patent Number: 5,204,009

[45] Date of Patent: Apr. 20, 1993

[54] SLURRY RISING APPARATUS AND METHOD THEREFOR

[75] Inventor: Steve Rowland, Ste. Thérèse, Canada

[73] Assignee: Kvaerner Hymac Inc., Canada

[21] Appl. No.: 745,007

[22] Filed: Aug. 14, 1991

[51] Int. Cl.⁵ .......................................... B01D 33/60
[52] U.S. Cl. ................................. 210/772; 210/783;
   210/216; 210/386; 210/401; 210/409; 162/60;
   162/301
[58] Field of Search ............... 210/772, 783, 216, 386,
   210/400, 401, 409; 162/60, 123, 301, 304, 343,
   298

[56] References Cited

U.S. PATENT DOCUMENTS

| | | | |
|---|---|---|---|
| 1,782,215 | 11/1930 | Shepperd | 162/298 |
| 3,092,538 | 6/1963 | Parker | 162/216 |
| 3,802,960 | 4/1974 | Spengos et al. | 162/216 |
| 3,802,965 | 4/1974 | Arledter | 162/301 |
| 3,839,143 | 10/1974 | Suckow | 162/343 |
| 3,840,430 | 10/1974 | Ely | 162/275 |
| 3,923,593 | 12/1975 | Verseput | 162/301 |
| 4,141,788 | 2/1979 | Justus | 162/301 |

Primary Examiner—Stanley S. Silverman
Assistant Examiner—Christopher Upton

[57] ABSTRACT

A method of rinsing a slurry contained between a pair of converging mesh belts comprising the steps of splitting the slurry into two streams, each stream adjacent one of the converging mesh belts, introducing a stream of rinsing fluid between the two slurry streams, the point of introduction of the rinsing fluid between the two slurry streams is not more than 12 inches before and not more than 72 inches after the slurry streams contact the converging mesh, and creating compressive forces within the pair of mesh belts, which compressive forces continue for a distance of at least 24 inches after introduction of the stream of rinsing fluid.

5 Claims, 2 Drawing Sheets

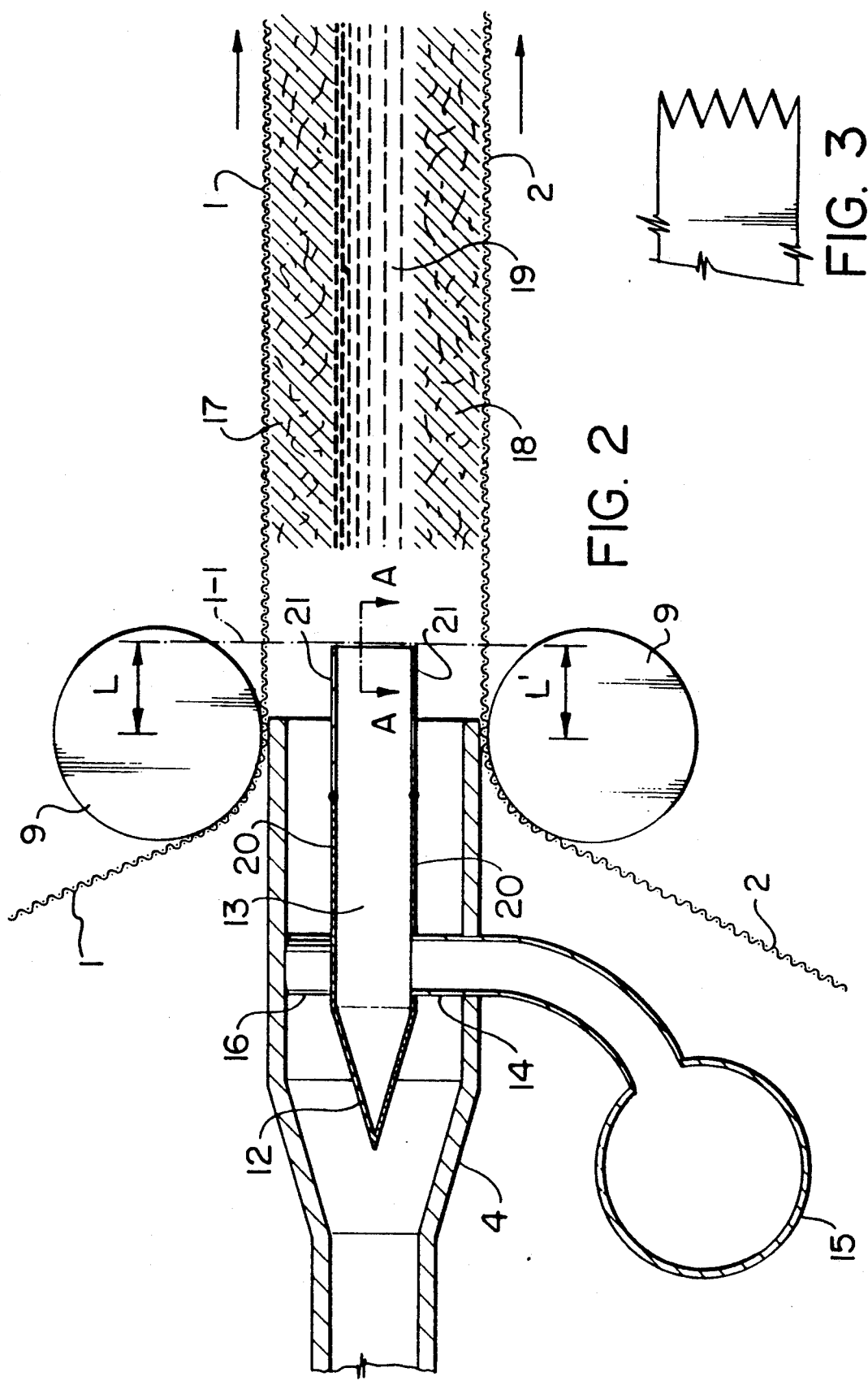

SLURRY RISING APPARATUS AND METHOD THEREFOR

The present invention describes methods and apparatus for rinsing soluble and/or small particulate materials from a slurry. The slurry stream is split into two flows and a rinsing fluid is introduced between the two slurry flows. The streams are introduced between a pair of converging mesh belts where compression is applied and the filtrate is expelled. Rinse fluid consumption is reduced.

BACKGROUND OF THE INVENTION

Devices for the separation of liquids from slurries are well known in the pulp and paper and mineral processing industries. One common device, the twin wire press, comprises a pair of endless mesh belts, guided over a series of rollers in a converging path. The slurry is introduced between the converging belts and compressive forces expel a large percentage of the liquid through the belts. An added benefit of removing liquid from the slurry is that dissolved solids and certain small particulates leave the slurry along with the liquid. The slurry is thereby rinsed, or washed, as the liquid is extracted. This process is known as dilution washing. High washing efficiencies may be achieved by using more liquid and/or by maximizing the outlet dryness of the dewatered slurry. Furthermore, if the dewatered slurry is rediluted with clean liquid and then rethickened, additional increases in washing efficiency can be achieved. This process is known as multi-stage dilution washing. Efforts are constantly being made to reduce the quantity of clean liquid required in order to achieve a given degree of washing efficiency.

Prior attempts to improve the washing process are disclosed in U.S. Pat. No. 2,111,720 to Padgett and U.S. Pat. No. 4,481,118 to Heissenberger et al.

The methods described by Padgett and Heissenberger et al have several disadvantages. Firstly they require a significant increase in the space requirements for the machinery required. Secondly the rinsing fluid cannot be applied in high volumes. Thirdly the rinsing fluid is applied to the outside of the pulp slurry and is subsequently removed from the outside of the pulp slurry. This limits the effectiveness of these methods. Fourthly it has been seen in practice that there is very little if any reduction in dilution liquid requirements when these methods are used.

The present invention overcomes the limitations of previous methods by introducing the rinsing fluid between two layers of pulp slurry thereby maximizing the rinsing effect of the liquid as it diffuses through the slurry. Accordingly only relatively small volumes of rinsing liquid are needed. A further advantage is that space requirements are not affected and there is no loss in drainage area of the mesh belts.

SUMMARY OF THE INVENTION

Broadly stated, the present invention is the method of rinsing a slurry contained between a pair of opposed mesh belts, travelling in the same direction, comprising the steps of a) separating the slurry flow into two streams, one adjacent to each of the two mesh belts, b) introducing a rinsing fluid between the two slurry streams not more than 12 inches before and not more than 72 inches after the slurry streams contact the converging mesh belts, and (c) applying compressive forces to expel the slurry liquid and the rinsing fluid through the mesh belts.

Another broad aspect of the present invention is the apparatus for rinsing a slurry contained between a pair of opposed travelling mesh belts, said apparatus consisting of a) means for separating the slurry flow into streams, one adjacent to each belt, b) means for introducing a rinsing fluid between the two slurry streams not more than 12 inches before and not more than 72 inches after the slurry streams contact the converging mesh belts, and c) means to apply compressive forces to expel the slurry liquid and the rinsing fluid through the mesh belts.

Other features and advantages of the invention will become more readily apparent from the following detailed description, drawings and claims.

BRIEF DESCRIPTION OF THE DRAWINGS

FIG. 2 is an enlargement of a portion of the twin wire press illustration which more clearly shows this embodiment of the invention.

FIG. 3 is a sectional view in plan looking outwardly through the stream splitter showing a saw toothed end of the stream splitter wall extension.

DESCRIPTION OF THE PREFERRED EMBODIMENTS

Figure 1:
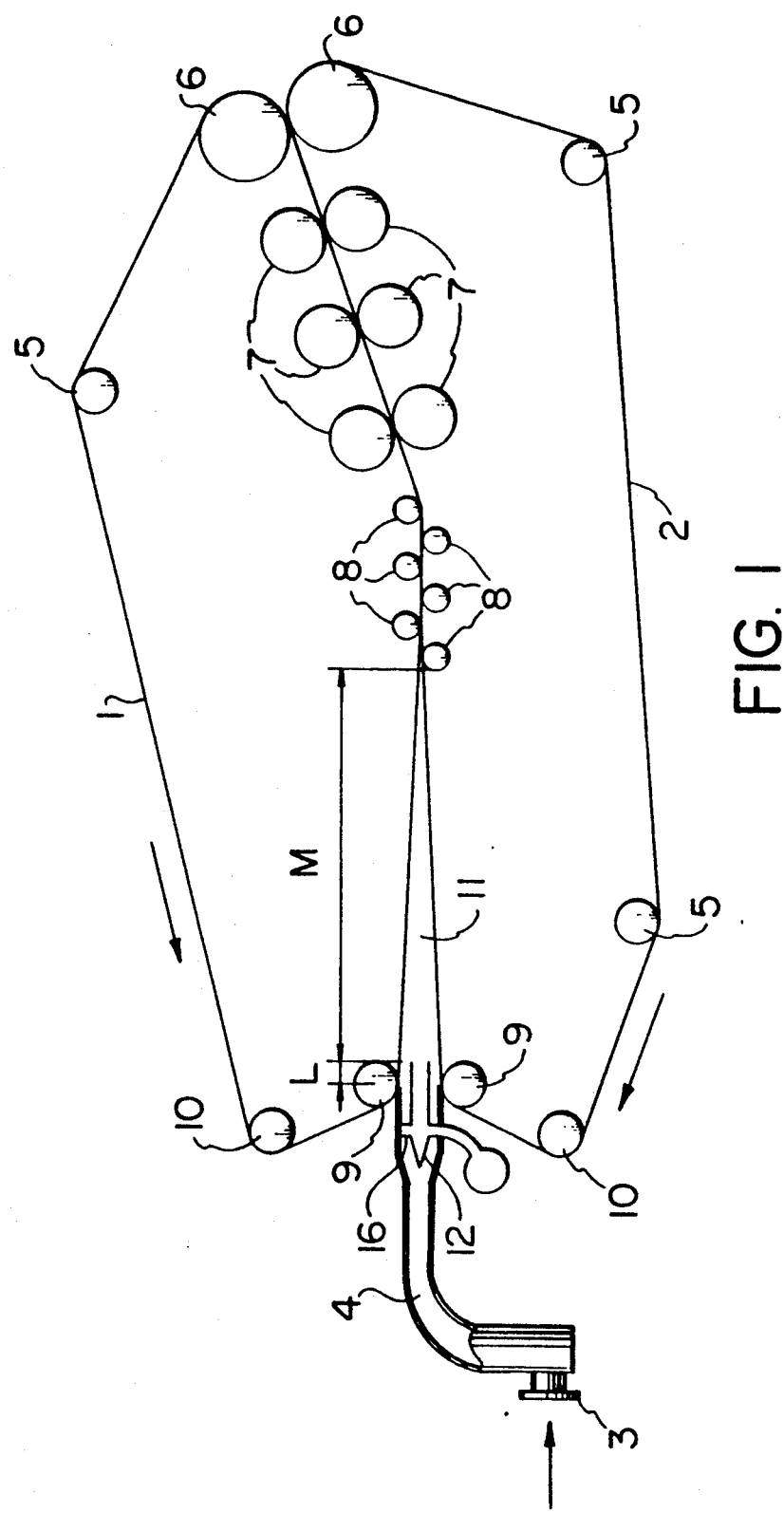
FIG. 1 is a schematic illustration of a twin wire belt press employing one embodiment of the invention.

The invention will be described as being used to remove water from a pulp slurry with water as the rinsing medium. It will be readily appreciated that the principles are equally valid for any type of slurry with any type of fluid as a rinsing medium.

As illustrated in the drawings the invention is adapted for use in connection with a twin wire press which comprises a first mesh belt 1 and a second mesh belt 2.

The endless mesh belts 1 and 2 are guided by rolls 5, 6, 7, 8, 9 and 10 to form two closed paths. A drive means, not shown, connected to rolls 6, causes the mesh belts 1 and 2 to move at equal linear speeds around their respective paths. The wire paths form a converging section 11 between rolls 9 and 8 after which they pass through an "S" section formed by rolls 8 and a press section formed by rolls 7.

A liquid pulp slurry is fed to the machine via inlet pipes 3. The inlet pipes 3 are connected to a flow distribution device 4 which causes the slurry to spread uniformly across the width of the machine.

In a conventional twin wire press the pulp slurry passes through the flow distribution device 4 into the converging section of the path of the mesh belts. The draining zone begins at the point where the mesh belts 1 and 2 leave the breast rolls 9. As the slurry travels with the pair of belts it is subjected to increasing compressive forces which expel water through the mesh belts. The sides of the converging section are sealed with long triangular sealing plates called deckles which are not shown. As water is removed a pulp sheet is formed.

In the embodiment of the invention as shown in FIGS. 1 and 2 a stream splitting device 12 is attached to the flow distribution device 4 via support posts 16. As shown in FIG. 2, as the slurry flows past the stream splitting device it is separated into two flows, one flow adjacent to the upper wire 1 and one flow adjacent to the lower wire 2. In the embodiment shown the stream splitter 12 is hollow. The hollow cavity 13 is connected via small pipes 14 to a large pipe 15. The small pipes 14 and the support posts 16 are of similar dimensions and are preferably foil shaped in cross-section in order to minimize transverse disturbance of the slurry flow. The walls 20 of the stream splitter are generally rigid in the region where the pipes and support posts are attached. The wall extensions 21 may be rigid, semi rigid or flexible. Rinsing water is introduced into the large pipe 15. The water flows into the hollow cavity 13 and then is introduced between the two pulp slurry streams. The wall extensions 21 serve to separate the water stream from the pulp streams and they also determine the location, denoted by the plane 1—1, where the water is introduced into the pulp streams. Plane 1—1 can be defined by the dimension "L", which is the distance from the center line of the breast rolls 9 to the plane 1—1. A positive dimension L indicates that plane 1—1 is situated after the breast rolls 9 as shown in FIG. 2. It is also possible for L to be negative indicating that plane 1—1 is situated prior to the breast rolls 9. In the embodiment shown, L' equals L, however it is equally possible to have L' greater or less than L. Furthermore other embodiments may have non-linear trailing edges of wall extensions 21. For example the trailing edges may be sawtoothed as shown in FIG. 3. When L is positive, the two pulp streams begin to dewater through the mesh belts prior to the water injection zone defined by plane 1—1. Within the path of the converging mesh belts we can now visualize three layers, the upper layer of pulp slurry 17, the lower layer of pulp slurry 18 and a central layer of rinsing water 19. As these three layers travel along the converging wire path, increasing compressive forces cause water to be expelled from the slurry and also cause the layer of rinsing water to diffuse through the two layers of pulp slurry. The length of this converging dewatering zone is indicated in FIG. 1 as dimension M. In the embodiment of the invention shown dimension L would be in the range of $-12''\leq L\leq 72''$ and dimension M would be in the range of $M>24''$. These dimensions may vary considerably depending on the characteristics of the slurry.

The amount of rinse water introduced into the large pipe 15 can be readily varied in order to achieve the desired degree of washing. Using the principles of this invention the required quantity of rinse water may be greatly reduced without deleteriously affecting the twin wire press operation, capacity or washing efficiency.

In a further enhancement of the invention, not illustrated, the rinsing stream may be divided into two streams. In this way the proportion of rinsing fluid passing through the upper and lower wires may be more accurately controlled.

It is to be understood that the present invention has been described with particular reference to the specific embodiment illustrated. Various changes and modifications are possible. Furthermore, other embodiments will be evident to those skilled in the art.

What is claimed is:

1. A method of rinsing a slurry contained between a pair of converging mesh belts in a twin wire press comprising the steps of:
    (a) feeding said slurry through slurry inlet means disposed between and positioned at an upstream end of a pair of converging mesh belts in a twin wire press, said pair of belts converging toward a point of convergence of said belts positioned downstream of said slurry inlet means;
    (b) providing slurry stream splitter means in said slurry inlet means, said slurry stream splitter means splitting the slurry into two stream, each stream being adjacent one of the converging mesh belts, said slurry stream splitter means having a closed upstream end having converging side walls to split said slurry into said two streams, a downstream end having substantially parallel upper and lower walls, an inlet means for a rinsing fluid, and an outlet means for said rinsing fluid at said downstream end of said splitter;
    (c) introducing a stream of rinsing fluid into said inlet of said slurry stream splitter means to form an upper slurry stream portion, a lower slurry stream portion, and a layer of rinsing fluid intermediate said two slurry stream layers, and
    (d) creating compressive forces within the pair of mesh belts.

2. The method of claim 1, wherein said rinsing fluid is divided into two or more streams.

3. The method of claim 1, wherein said compressive forces continue for a distance of at least 24 inches after introduction of said stream of rinsing fluid.

4. The method of claim 1, wherein said rinsing fluid is introduced not more than 12 inches before and not more than 72 inches after the slurry streams contact said converging mesh belts.

5. A twin wire press comprising:
    a pair of converging belts,
    at least one slurry inlet disposed between said pair of converging belts and positioned at an upstream end thereof, said pair of belts converging toward a point of convergence of said belts positioned downstream of said slurry inlet means,
    slurry steam splitter means positioned in said slurry inlet means, said slurry stream splitter means having a closed upstream end having converging side walls to split said slurry into said two streams, a downstream end having substantially parallel upper and lower walls, an inlet means for a rinsing fluid, and an outlet means for said rinsing fluid at said downstream end of said splitter.

* * * * *

UNITED STATES PATENT AND TRADEMARK OFFICE
CERTIFICATE OF CORRECTION

PATENT NO. : 5,204,009
DATED : April 20, 1993
INVENTOR(S) : STEVE ROWLAND It is certified that error appears in the above-identified patent and that said Letters Patent is hereby corrected as shown below:

On the cover page, the title, "SLURRY RISING APPARATUS AND METHOD THEREFOR" should read --SLURRY RINSING APPARATUS AND METHOD THEREFOR--.

Column 4,
Claim 5, line 8 of the claim, "steam" should read --stream--.

Signed and Sealed this

Seventh Day of December, 1993

*Attest:*

BRUCE LEHMAN

*Attesting Officer*       *Commissioner of Patents and Trademarks*